(12) United States Patent
Daughtry

(10) Patent No.: US 6,185,694 B1
(45) Date of Patent: Feb. 6, 2001

(54) DYNAMIC CLOCK DISTRIBUTION

(75) Inventor: Gregory M. Daughtry, Portland, OR (US)

(73) Assignee: Intel Corp., Santa Clara, CA (US)

( * ) Notice: Under 35 U.S.C. 154(b), the term of this patent shall be extended for 0 days.

(21) Appl. No.: 09/222,957

(22) Filed: Dec. 30, 1998

(51) Int. Cl.[7] ........................................................ G06F 1/10
(52) U.S. Cl. ............................................................. 713/601
(58) Field of Search ................................... 713/500, 601

(56) References Cited

U.S. PATENT DOCUMENTS

| | | | |
|---|---|---|---|
| 5,450,574 | * 9/1995 | Madter et al. | 713/601 |
| 5,511,209 | * 4/1996 | Mensch, Jr. | 713/500 |
| 5,630,143 | * 5/1997 | Maher et al. | 713/310 |
| 5,754,837 | * 5/1998 | Walsh et al. | 713/500 |
| 6,055,644 | * 4/2000 | Henkel | 713/500 |

* cited by examiner

Primary Examiner—Thomas M. Heckler
(74) Attorney, Agent, or Firm—Antonelli, Terry, Stout & Kraus, LLP

(57) ABSTRACT

A system including a first graphics controller and an expansion slot for coupling a second graphics controller. The first graphics controller generates first graphic symbols based on data stored in the system memory in synchronism with clock signals received from a clock circuit. Similarly, the second graphics controller generates second graphic symbols based on data stored in the system memory in synchronism with clock signals received from the clock circuit. When the second graphics controller is not coupled to the expansion slot, the processor provides a graphics select signal. A clock steering circuit responds to the graphics select signal by applying the clock signals to the first graphics controller, while blocking the clock signals to the expansion slot. In the absence of the graphics select signal, the clock steering circuit applies the clock signals to the expansion slot for application to the second graphics controller, while blocking the clock signals to the first graphics controller.

15 Claims, 2 Drawing Sheets

DYNAMIC CLOCK DISTRIBUTION

FIELD

The present invention relates to dynamic clock distribution.

BACKGROUND

There exists a continuing need for an arrangement effecting selective enabling/disabling of an existing functional block and an expansion functional block within a system (e.g., on a motherboard), while reducing the liklihood of malfunctioning or degrading (e.g., overloading) of a system clock. Considering a graphics controller functional block as an example, some resellers of computer systems desire to provide their customers with a selection of graphics capabilities, and thus desire to provide computer systems capable of being fitted with different graphics controllers. However, manufacturers generally desire to provide a generic graphics controller as standard equipment, while leaving it to the resellers to add a customized one at the time of sale of the system, if desired. In addition, some users of computer systems may at some time after the purchase decide to upgrade or change the graphics controller by inserting one in an expansion slot on the computer. Having two graphics controllers coupled to the computer system clock circuit at the same time might create an undesirable clock circuit load, and might cause edge rate degradation of the clock signals.

In the past, a dual in-line package (DIP) switch, a jumper, or other hardware on the motherboard was used to activate the add-on graphics controller, while disabling the built-in one. This is a cumbersome process employing tedious intervention by the user, in contrast to easier "plug-and-play" additions to the computer system.

SUMMARY

The present invention is an arrangement for dynamic clock distribution with respect to functional blocks. A clock control circuit includes a source of a select signal for selecting between operation of a first functional block and a second functional block. A clock steering circuit receives clock signals from a clock signal source and in response to a first predetermined state of the select signal prevents clock signals from being applied to the first functional block while enabling clock signals to be applied to the second functional block. In response to a second predetermined state of the select signal, the clock steering circuit enables clock signals to be applied to the first functional block while preventing clock signals from being applied to the second functional block.

BRIEF DESCRIPION OF THE DRAWINGS

The follow present brief descriptions of the drawings, wherein.

DETAILED DESCRIPTION

Figure 1:
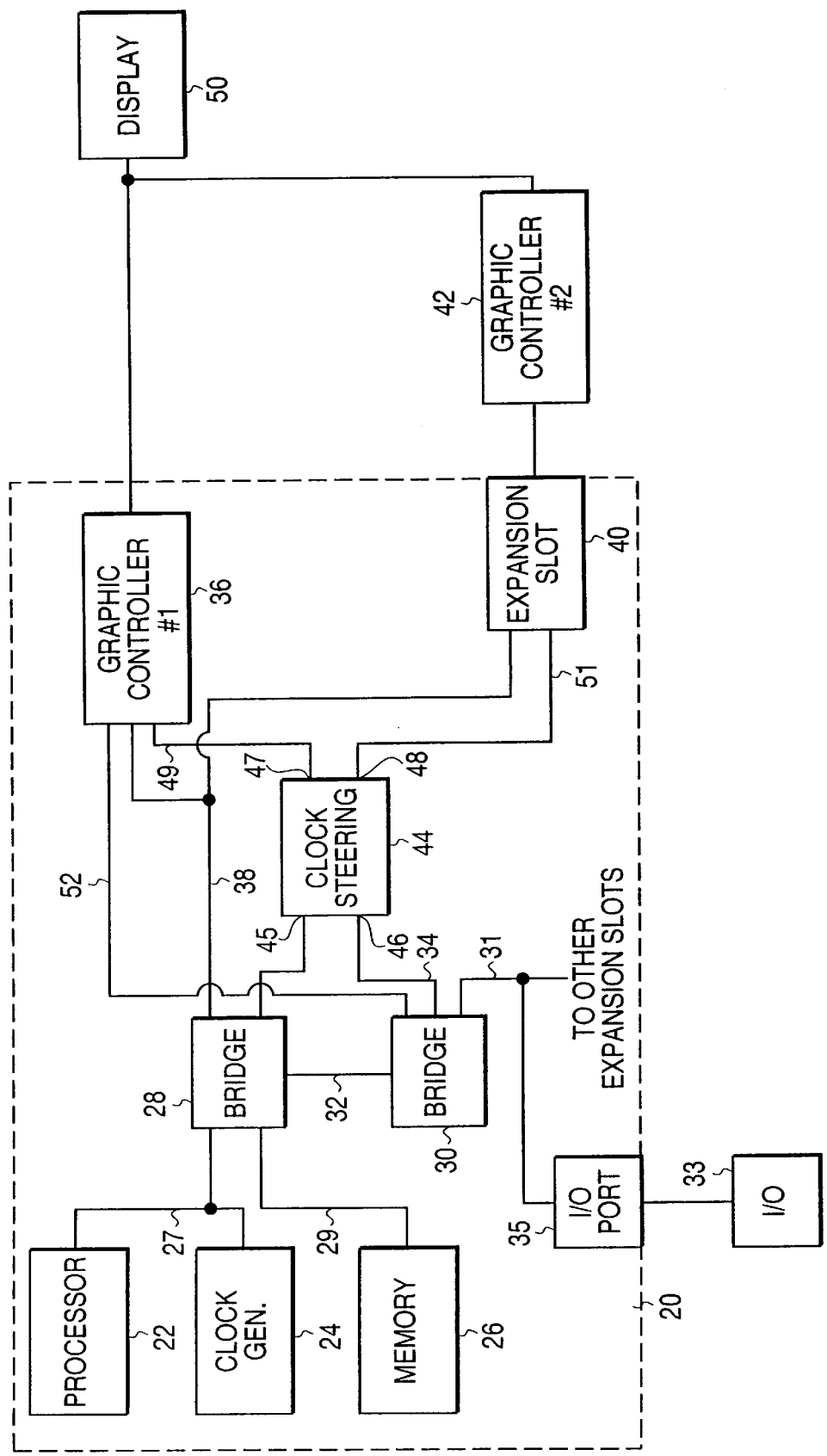
FIG. 1 is a block diagram of an example computer system having a clock steering circuit with respect to two graphic controllers, in accordance with an embodiment of the present invention.

When appropriate, like reference numerals and characters are used to designate identical, corresponding or similar components in differing drawing figures.

FIG. 1 depicts the several components of an example system mounted on a motherboard 20. These components include a processor 22, a clock generator 24, and a first bridge circuit 28 which are intercoupled by a bus 27 having a plurality of lines. This example system further includes a memory 26 which is also coupled to bridge circuit 28 by connection 29. Bridge circuit 28 services a bus 32 capable of having a plurality of input/output devices disposed therealong and can be coupled to a second bridge circuit 30. Second bridge circuit 30 is, for example, coupled by bus 31 to various expansion slots for other components, in well known manner. The system further includes input/output (I/O) devices 33 coupled to bus 31 through I/O port 35.

A first (e.g., generic) graphics controller 36 is mounted on motherboard 20 and is coupled to first bridge circuit 28 by a bus 38 for receipt of graphics signals from processor 22. An expansion slot 40 on motherboard 20 can be used to mount a second graphics controller 42, which may be an optional or an upgrade controller, or a replacement, in the event of failure of first graphics controller 36. Expansion slot 40 is also coupled by bus 38 to first bridge circuit 28 for receipt of graphics signals from processor 22.

A clock steering circuit 44 may also be mounted on motherboard 20 and has a clock input port 45 which receives clock signals originating from clock circuit 24, by way, for example, of first bridge circuit 28. Clock steering circuit 44 also has a second input port 46 which receives graphic select signals, originating from the processor 22, by way of second bridge circuit 30 and connection 34. Clock steering circuit 44 is not limited to such inputs; for example, input port 45 may receive the clock signals directly from another programmable device, rather than from clock generator 24 through first bridge circuit 28. Also, input port 46 may receive the graphics select signal from first bridge circuit 28, rather than through the more complex route of bus 32, second bridge circuit 30, and bus 34.

Clock steering circuit 44 has a first output port 47 which can provide clock signals on line 49 to first graphics controller 36 and a second output 48 coupled by line 51 to expansion slot 40 which can provide clock signals to second graphics controller 42. Graphics controllers 36 and 42 in turn may be coupled to display 50 to provide graphical displays.

Figure 2:
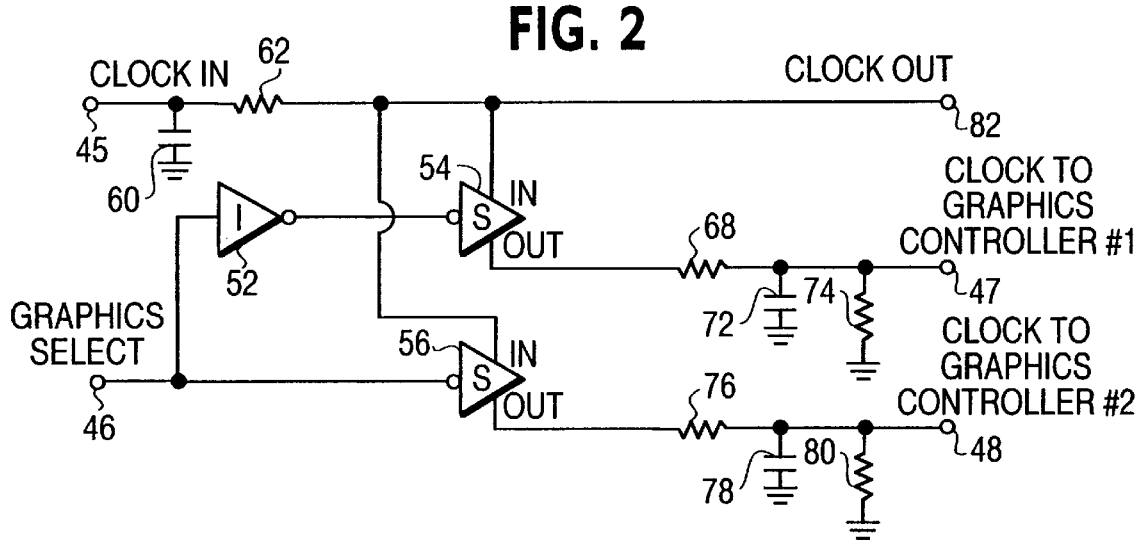
FIG. 2 is a schematic diagram of an example clock steering circuit suitable for use in the system of FIG. 1.
Figure 3:
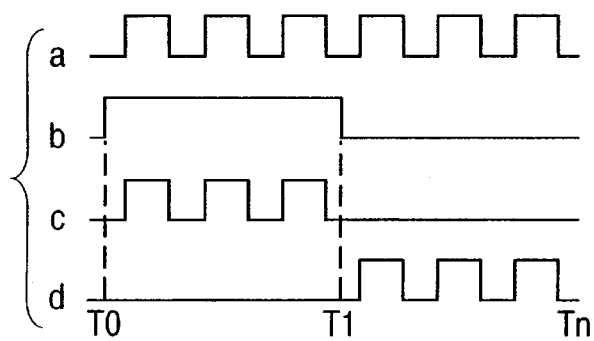
FIGS. 3a–3d are timing diagrams illustrative of the operation of the clock steering circuit of FIG. 2.

FIG. 2 depicts an example clock steering circuit suitable for use as clock steering circuit 44 in accordance with an embodiment of the present invention, although other suitable gating circuitry, known to those skilled in the art, could be utilized. FIGS. 3a–3d are timing diagrams illustrative of the operation of the circuit of FIG. 2. Clock signals, illustrated in FIG. 3a, are applied to input terminal 45 which is coupled to ground through capacitor 60 and is coupled by resister 62 to the signal input port of switching circuit 54 and the signal input port of switching circuit 56. A graphics select signal, illustrated in FIG. 3b, is applied from input terminal 46 through inverter 52 to the control input port of switching circuit 54 and also is applied directly from input terminal 46 to the control input port of switching circuit 56.

The signal output port of switching circuit 54 is coupled through resistor 68 to output terminal 47 which is coupled to first graphics controller 36. The junction of resistor 68 and output terminal 47 is coupled to ground through the parallel combination of capacitor 72 and resistor 74. In a similar manner, the signal output port of switching circuit 56 is coupled through resistor 76 to output terminal 48 which is coupled to expansion slot 40, and the junction of resistor 76 and output terminal 48 is coupled to ground through the parallel combination of capacitor 78 and resistor 80. Resistors 68, 74, 76, and 80 and capacitors 72 and 78 have values selected to provide the desired slope or edge rate to the clock pulse output signals from switching circuits 54 and 56, respectively, permitting timing of the edge rate to accommodate the characteristics of the particular switching circuits. These components may be omitted if the clock signal edge rate is otherwise controlled or is not of concern.

As illustrated in FIGS. 3a–3d, in the absence of a graphics select signal (FIG. 3b) on input terminal 46, switching circuit 54 blocks the clock signals (Pig. 3a) from output terminal 47 (FIG. 3c), while switching circuit 56 applies the clock signals through resistor 76 to output terminal 48 (FIG. 3d). This enables second graphics controller 42 to provide graphics signals to display 50. When a graphics select signal (FIG. 3b) is applied to input terminal 46, switching circuit 54 applies the clock signals (FIG. 3a) through resistor 68 and output terminal 47 (FIG. 3c) to first graphics controller 36, while switching circuit 56 blocks the clock signals from output terminal 48 (FIG. 3d) and expansion slot 40. This enables first graphics controller 36 to provide graphics signals to display 50.

Each switching circuit 54 and 56 might be a field effect transistor (FET) switch, such as an SN74CBT3306 dual FET switch available from Texas Instruments, Inc., for example. If desired, the clock signals from input terminal 45 can be applied from resistor 62 to an additional output terminal 82 for application to other destinations.

Processor 22 performs processing functions utilizing data stored in memory 26 and applies results of those processing functions to other components, such as memory 26, all with timing based on clock signals from clock circuit 24. For example, with respect to the dynamic clock distribution, a program may be installed within memory 26 which queries the status of the system upon each system initialization to determine whether there is a graphics controller installed within expansion slot 40. The query can be answered in a number of ways, such as via a keyboard, mouse, or other manual input signal from a user, but in a plug-and-play approach installation of second graphics controller 42 is automatically sensed by processor 22 directly from expansion slot 40, e.g., by mechanical and/or optical sensing, or from second graphics controller 42, e.g., by polling. Further, in a plug-and-play approach, processor 22 automatically (e.g., transparently) changes over the graphics select signal, and thus clock redistribution, when appropriate, without user intervention.

If there is no graphics controller in expansion slot 40 (e.g., at time T0 in FIG. 3), then processor 22 senses this and causes a graphics select signal to be applied (FIG. 3b, between times T0 and T1) through first bridge circuit 28, bus 32 and second bridge circuit 30 to connection 34 which applies the signal to input port 46 of clock steering circuit 44. This causes clock steering circuit 44 to apply clock signals (FIG. 3c, between times T0 and T1) received from first bridge circuit 28 to first graphics controller 36 via output terminal 47 and connection 49. Alternatively, if second graphics controller 42 is in expansion slot 40 (e.g., installed at time T1 in FIG. 3), a graphics controller installed signal (not shown), for example from expansion slot 40 on bus 38, is sensed by processor 22, and no graphics select signal (e.g., FIG. 3b, between times T1 and Tn) is applied to clock steering circuit 44. Instead, a reset signal (not shown) is applied to first graphics controller 36 on line 52 from second bridge circuit 30. Accordingly, in response to the absence of the graphics select signal, clock steering circuit 44 applies clock signals (FIG. 3d, between times T1 and Tn) via output terminal 48 and connection 51 to expansion slot 40, from which the signals are applied to second graphics controller 42. Connection 49 from clock steering circuit 44 to first graphics controller 36 can thus be considered a first graphics controller connection, while connection 51 from clock steering circuit 44 to expansion slot 40 can be considered a second graphics controller connection.

Figure 4:
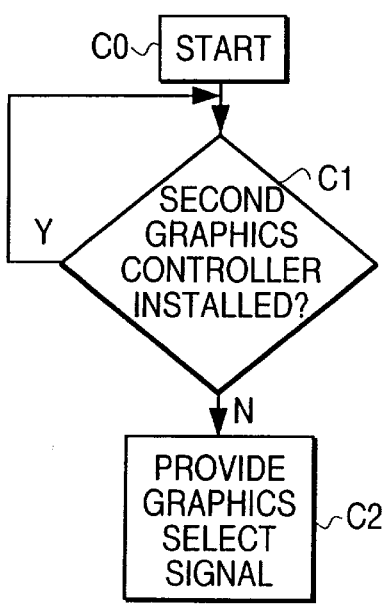
FIG. 4 is a chart illustrating an example method of determining whether a second graphics controller is coupled to the system in accordance with an embodiment of the present invention.

FIG. 4 is an example flow chart illustrating this. Once the system is started in block C0, block C1 determines whether a graphics controller is installed in expansion slot 40. If not, then in block C2 the graphics select signal is provided. If there is a graphics controller installed in expansion slot 40, the graphics select signal is not provided, and the flow repeats block C1 or ends.

Figure 5:
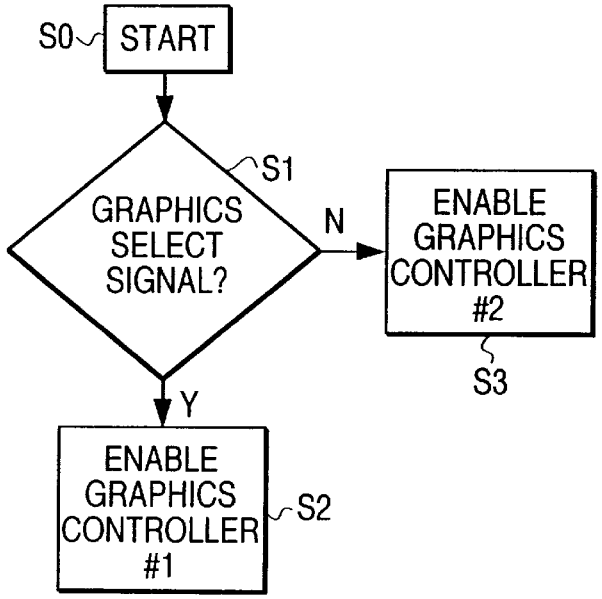
FIG. 5 is a flowchart illustrating an example method in accordance with an embodiment of the present invention.

FIG. 5 illustrates an example method in accordance with an embodiment of the present invention. Once the system is started in block S0, block S1 determines whether the graphics select signal is present. If yes, then in block S2 first graphics controller 36 is enabled by having clock signals applied to it. If block SI determines that the graphics select signal is not present, then in block S3 second graphics controller 42 is enabled by having clock signals applied to it.

The described embodiments thus permit provision of two graphics controllers without an undesirable clock circuit load. Presence of a second graphics controller in expansion slot 40 results in processor 22 inhibiting the graphics select signal, resulting in that second graphics controller receiving clock signals, while the clock signals are blocked from the first graphics controller, thus providing a plug-and-play capability.

Although the present invention has been described with reference to a number of illustrative embodiments thereof, it should be understood that numerous other modifications and embodiments can be devised by those skilled in the art having the benefit of this specification which will fall within the spirit and scope of the principles of the invention. More particularly, reasonable variations and modifications are possible in the component parts and/or their arrangement within the scope of the foregoing disclosure, the drawings and the appended claims, without departing from the spirit of the invention. In addition to variations and modifications in the component parts and/or arrangements, alternative uses and/or environments will also be apparent to those skilled in the art. As possible modifications, the arrangement of the present invention may control enabling/disabling of the functional blocks, such as graphics controllers, by provision/non-provision of a parameter differing from the clock signal, e.g., application/non-application of power or ground to either part of or the whole of each functional block.

What is claimed is:

1. A clock control circuit, comprising:

a source of a select signal for selecting between operation of a first functional block and a second functional block;

a clock steering circuit for receiving clock signals from a clock signal source and responsive to a first predetermined state of the select signal for preventing received clock signals from being applied to the first functional block while enabling received clock signals to be applied to the second functional block, said clock steering circuit being responsive to a second predetermined state of the select signal for enabling received clock signals to be applied to the first functional block while preventing received clock signals from being applied to the second functional block.

2. A graphics clock control circuit, comprising:
   a source of a graphics select signal; and
   a clock steering circuit for receiving clock signals from a clock signal source and responsive to a first predetermined state of the graphics select signal for preventing received clock signals from being applied to a first graphics controller connection while enabling received clock signals to be applied to a second graphics controller connection, said clock steering circuit being responsive to a second predetermined state of the graphics select signal for enabling received clock signals to be applied to said first graphics controller connection while preventing received clock signals from being applied to said second graphics controller connection.

3. A graphics clock control circuit as claimed in claim 2, further comprising:
   a first graphics controller coupled to said first graphics controller connection and responsive to data applied thereto for generating first graphics symbols in synchronism with clock signals applied thereto; and
   a second graphics controller coupled to said second graphics controller connection and responsive to data applied thereto for generating second graphics symbols in synchronism with clock signals applied thereto.

4. A graphics clock control circuit as claimed in claim 3, further comprising a motherboard having said first graphics controller connection, said first graphics controller, said clock steering circuit, and said graphics select signal source mounted thereon; and wherein said second graphics controller connection comprises an expansion slot mounted on said motherboard.

5. A graphics clock control circuit as claimed in claim 4, wherein said expansion slot has the capability to respond to the second graphics controller being coupled in said expansion slot by providing a graphics controller installed signal; and wherein said graphics select signal source comprises a processor mounted on said motherboard and responsive to absence of the graphics controller installed signal to generate the graphics select signal and responsive to presence of the graphics controller installed signal to inhibit the graphics select signal.

6. A graphics clock control circuit as claimed in claim 5, wherein said processor is adapted to perform processing functions, and said circuit further comprises:
   a memory mounted on said motherboard for storing a program for controlling the processing functions by said processor, data for use in the processing functions by said processor and in generating graphic symbols by said first and second graphic controllers, and data resulting from the processing functions by said processor;
   a clock circuit mounted on said motherboard for generating clock signals; and
   an input/output port mounted on said motherboard for inputting and outputting data and commands.

7. A graphics clock control circuit as claimed in claim 6, wherein said clock steering circuit comprises:
   first and second switching circuits, each switching circuit having a signal input port, a control input port, and an output port, each switching circuit blocking signals received at its signal input port from its output port and responsive to receipt of a control signal at its control input port for coupling its signal input port to its output port;
   a clock signal input terminal for applying the clock signals to the signal input port of each switching circuit;
   a graphics select signal input terminal responsive to one of provision and inhibition of the graphics select signal, for applying a control signal to the control input port of said first switching circuit to cause said first switching circuit to apply clock signals to said first switching circuit output port; and
   an inverter responsive to an opposite of said one of provision and inhibition of the graphics select signal, for applying a control signal to the control input port of said second switching circuit to cause said second switching circuit to apply clock signals to said second switching circuit output port.

8. A graphics clock control circuit as claimed in claim 2, wherein said clock steering circuit comprises:
   first and second switching circuits, each switching circuit having a signal input port, a control input port, and an output port, each switching circuit blocking signals received at its signal input port from its output port and responsive to receipt of a control signal at its control input port for coupling its signal input port to its output port;
   a clock signal input terminal for applying the clock signals to the signal input port of each switching circuit;
   a graphics select signal input terminal responsive to receipt of the graphics select signal for applying a control signal to the control input port of said first switching circuit to cause said first switching circuit to apply clock signals to said first switching circuit output port; and
   an inverter responsive to absence of the graphics select signal at said graphics select signal input terminal for applying a control signal to the control input port of said second switching circuit to cause said second switching circuit to apply clock signals to said second switching circuit output port.

9. A graphics clock control circuit as claimed in claim 8, further comprising
   a first graphics controller coupled to said first graphics controller connection and responsive to data applied thereto for generating first graphics symbols in synchronism with clock signals applied thereto; and
   a second graphics controller coupled to said second graphics controller connection and responsive to data applied thereto for generating second graphics symbols in synchronism with clock signals applied thereto.

10. A graphics clock control circuit as claimed in claim 9, further comprising a motherboard having said first graphics controller connection, said first graphics controller, said clock steering circuit, and said graphics select signal source mounted thereon; and wherein said second graphics controller connection comprises an expansion slot mounted on said motherboard.

11. A graphics clock control circuit as claimed in claim 10, wherein said expansion slot has the capability to respond to the second graphics controller being coupled in said expansion sent by providing a graphics controller installed signal; and wherein said graphics select signal source comprises a processor mounted on said motherboard and responsive to absence of the graphics controller installed signal to generate the graphics select signal and responsive to presence of the graphics controller installed signal to inhibit the graphics select signal.

12. A method of selecting one of a first graphics controller and an expansion slot for receipt of clock signals, said method comprising:

(a) when a second graphics controller is coupled to the expansion slot, applying the clock signals to the expansion slot for application to the second graphics controller, while blocking the clock signals to the first graphics controller; and (b) when the second graphics controller is not coupled to the expansion slot, applying the clock signals to the first graphics controller, while blocking the clock signals to the expansion slot.

13. A method of selecting one of a first graphics controller and an expansion slot for receipt of clock signals, said method comprising:

(a) detecting whether a second graphics controller is coupled to the expansion slot;

(b) when the second graphics controller is coupled to the expansion slot, causing a graphics select signal to have a first predetermined state;

(c) when the second graphics controller is not coupled to the expansion slot, causing the graphics select signal to have a second predetermined state;

(d) when the graphics select signal is in a first one of the first predetermined state and the second predetermined state, applying the clock signals to the first graphics controller and blocking the clock signals to the expansion slot; and (e) when the graphics select signal is in an opposite one of the first predetermined state and the second predetermined state, applying the clock signals to the expansion slot for application to the second graphics controller and blocking the clock signals to the first graphics controller.

14. A method as claimed in claim 13, wherein:

the first predetermined state inhibits the graphics select signal;

the second predetermined state provides the graphics select signal;

(d) comprises applying clock signals to a clock steering circuit, and causing the clock steering circuit to apply the clock signals to the first graphics controller and to block the clock signals to the expansion slot when the graphics select signal is provided; and (e) comprises applying the clock signals to the clock steering circuit, and causing the clock steering circuit to apply the clock signals to the expansion slot and to block the clock signals to the first graphics controller when the graphics select signal is inhibited.

15. A method as claimed in claim 14, wherein:

the clock steering circuit comprises a first switching circuit and a second switching circuit;

(d) comprises passing the clock signals from the first switching circuit to the first graphics controller; and (e) comprises passing the clock signals from the second switching circuit to the second graphics controller.

* * * * *